T. F. SCOTT.
VEHICLE WHEEL.
APPLICATION FILED DEC. 19, 1908.

938,796.

Patented Nov. 2, 1909.

WITNESSES.
Marion E. Brown
Samuel Richmond

INVENTOR.
THOMAS F. SCOTT
BY
Albert W. Brown,
ATTORNEY.

UNITED STATES PATENT OFFICE.

THOMAS F. SCOTT, OF EVERETT, MASSACHUSETTS.

VEHICLE-WHEEL.

938,796.  Specification of Letters Patent.  Patented Nov. 2, 1909.

Application filed December 19, 1908. Serial No. 468,674.

*To all whom it may concern:*

Be it known that I, THOMAS F. SCOTT, a citizen of the United States, residing at the city of Everett, in the county of Middlesex and State of Massachusetts, have invented new and useful Improvements in Vehicle-Wheels, of which the following is a specification.

This invention relates to a wheel for an automobile, or other vehicle, having a hub in sections or parts severally arranged side by side and with the outer sections journaled on a common axle, and the middle or intermediate section free to turn about the axle and to slide between said outer sections in a vertical direction across said axle, and a pair of resilient cushions, preferably pneumatic rings of india rubber, or other suitable material, which are arranged one at each side of the middle section and about the outer section thereat, and are confined to said several sections all so as to turn as one; the middle section being suitably adapted, as for illustration, with radially extending spokes and a tire, as well known, to serve with a hub, such as aforesaid, as a wheel resiliently cushioned as aforesaid.

The invention mainly consists in the combination with a wheel, substantially such as above described, of keys joining the outer sections to the middle section, and in a manner to turn in common with said several sections and to permit the aforesaid slide of the middle section, and of a horizontal lateral movement, all substantially as hereinafter described. Further the invention consists of improvements in detail, as will hereinafter appear.

In the accompanying drawings, forming part of this specification, a vehicle-wheel embodying this invention is illustrated in the most approved form of construction and arrangement of its several parts.

Figure 1:
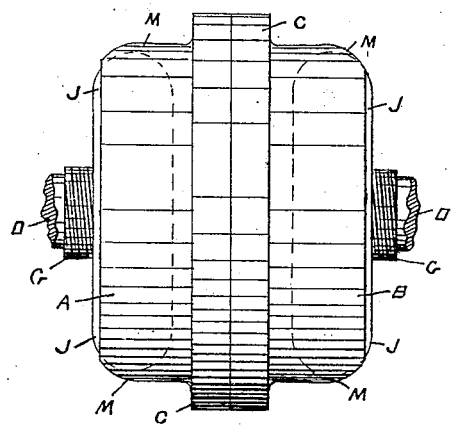
Figure 2:
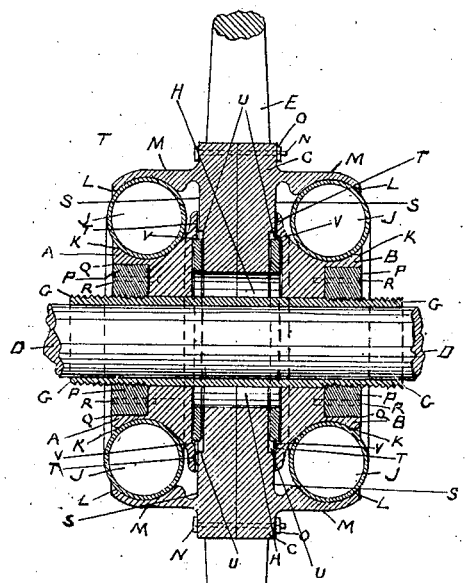
Figure 3:
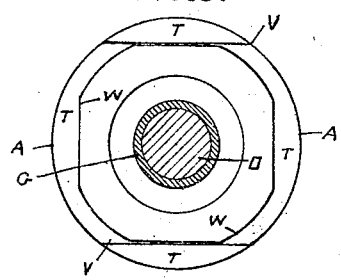

Figure 1 is a side elevation of the hub and central portion only of the wheel and axle and the axle, at each end, broken off. Fig. 2 is a central transverse vertical section of the hub and central portion of the wheel-hub shown in Fig. 1, and in the vertical longitudinal plane of the axis of the wheel-axle which is in side elevation, and at each end broken off. Fig. 3 is a face view of a key detached.

In the drawings, A and B are the outer sections and C is the middle section of the hub; D is the axle common to all said sections; E, E are diametrically opposite spokes and F is the tire of said middle hub-section, or in other words of the wheel proper.

The outer hub-sections A, B, are at each side of the middle or intermediate hub-section C, and both said hub-sections A, B, are journaled on the axle D and they are held on a common bushing-sleeve G, which extends between the two and makes the bearing proper thereof on the axle. The middle hub-section C is between the two outer hub-sections A, B, and it has a central bore H of larger diameter than that of the bushing G, and otherwise it is arranged so that it can slide vertically between said outer sections and in a direction across the axle.

J, J are the pair of resilient cushions, particularly shown as pneumatic rings of india rubber, or other suitable material. There is a cushion J about each outer hub-section A, B, and, in each instance, each is seated in the concave circular edge K of the section and otherwise it is located and confined in its said bearing between said section and the circular running concave face L about the periphery at the inner side of a circular running and lateral extension M at each side of the middle hub-section C.

The middle hub-section C is centrally and diametrically divided into two similar parts secured together by headed screw-bolts N and nuts O (two only shown) located at and about the hub, and outside of said lateral extension M of the middle hub-section.

The outer hub-sections A, B are held on the axle D and against each side-face of the middle hub-section C, by means of screw-nuts P, P, which are screwed onto the screw-threaded ends of the bushing G and enter into circular running recesses Q, Q of suitable diameter and depth in the outer hub-sections A, B, and also are fastened against accidental turning by means of screw-pins R, R screwing into and through them and into the outer hub-sections A, B.

The face S of each outer side of the middle hub-section C and the face T of each inner side of each outer hub-section and which are adjacent to each other have a recess U and V, respectively therein, and said two recesses U, V, in each instance, are opposed to each other and contain in common a similar key W in the form of a plate (Fig. 3) and each key W lies within said opposed recesses and has a central circular opening or bore through it corresponding in diameter to the central circular opening or bore H of the middle hub-section C. Each recess U of the middle hub-section C is greater in its vertical dimension than the dimension of the key W in a corresponding direction, and so, as is plain, the middle hub-section is free to move between the side hub-sections A, B, and on the key-plate W in a vertical direction across the axle. And again the recess V of each side hub-section A, B is greater in its horizontal direction than the dimension of the key W in a corresponding direction and so, as is plain, each side hub-section and the key-plate are free for a movement in a horizontal direction across the axle, and otherwise than as explained the dimensions of said several recesses U, V are such as to permit of only the movements stated.

From the above description, it is obvious that the said several sections of the hub are tied together by the keys and otherwise all parts are held so as to turn as one whole, while, at the same time, free movement vertically and horizontally of the hub-sections is permitted and a resilient cushioned running wheel secured.

It is not intended to limit this invention in any respect to the resilient cushions for the wheel described, as it is obvious others may be substituted for them, and this invention in no manner consists therein, the same being well known in every respect and particular.

Having thus described my invention what I claim and desire to secure by Letters Patent is,

1. A vehicle-wheel, composed of a hub, in sections or parts arranged alongside of each other about and free to turn on a common axle, and the middle section free to slide between the outer or side hub-sections in a direction across the axle, and of twin resilient cushions at each outer section and confined therebetween and lateral extensions at the sides of the middle hub-section, in combination with keys about the axle and between the middle hub-section and each side hub-section and seated in recesses thereof which are adapted to allow of movements of the hub-sections in directions at right angles to each other and relative to the axle, substantially as described.

2. A vehicle-wheel, composed of a hub in sections or parts arranged alongside of each other about and free to turn on a common axle, and the middle section free to slide between the outer or side hub-sections in a direction across the axle and of twin resilient cushions at each outer or side hub-section and confined therebetween and lateral extensions at the sides of the middle hub-section, in combination with a bushing to the axle, and screw-nuts screwed onto the outer ends of said bushing, and screw-pins fastening said screw-nuts to said side hub-sections, substantially as described, for the purpose specified.

In witness whereof, I have hereunto set my hand in the presence of two subscribing witnesses.

THOMAS F. SCOTT.

Witnesses:
 ALBERT W. BROWN,
 TILDEN H. SNOW.